(12) United States Patent
Braun et al.

(10) Patent No.: US 12,545,325 B1
(45) Date of Patent: Feb. 10, 2026

(54) QUICK REPLACE FORKED WEARABLE SHIM

(71) Applicant: Caterpillar Inc., Peoria, IL (US)

(72) Inventors: Andrew Joseph Braun, High Ridge, MO (US); Ryan P. Morge, Clinton, IL (US); David W. Holthaus, Monticello, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 18/920,534

(22) Filed: Oct. 18, 2024

(51) Int. Cl.
*B62D 17/00* (2006.01)
*B60G 7/02* (2006.01)

(52) U.S. Cl.
CPC .............. *B62D 17/00* (2013.01); *B60G 7/02* (2013.01); *B60G 2200/46* (2013.01); *B60G 2200/4622* (2013.01); *B60G 2200/464* (2013.01); *B60G 2204/143* (2013.01); *B60G 2204/4402* (2013.01); *B60G 2204/61* (2013.01); *B60G 2206/91* (2013.01)

(58) Field of Classification Search
CPC ...... B62D 17/00; B60G 7/02; B60G 2200/46; B60G 2200/4622; B60G 2200/464; B60G 2204/143; B60G 2204/4402; B60G 2204/61; B60G 2206/91
See application file for complete search history.

(56) References Cited

U.S. PATENT DOCUMENTS

| | | | |
|---|---|---|---|
| 4,232,068 A | 11/1980 | Hoh et al. | |
| 6,375,205 B1 | 4/2002 | De Fontenay et al. | |
| 6,688,617 B2 | 2/2004 | Chamberlin | |
| 7,207,583 B2 | 4/2007 | Ross et al. | |
| 9,315,222 B1 | 4/2016 | Wetter et al. | |
| 9,677,638 B2 | 6/2017 | Fratini et al. | |
| 10,829,905 B1 | 11/2020 | Goodhind | |
| 11,130,380 B2 | 9/2021 | Johnson | |
| 2003/0079946 A1* | 5/2003 | Takizawa | F16B 43/005 188/24.11 |

(Continued)

FOREIGN PATENT DOCUMENTS

| | | |
|---|---|---|
| CN | 205469092 U | 8/2016 |
| EP | 3115235 B1 | 4/2018 |

(Continued)

OTHER PUBLICATIONS

Written Opinion and International Search Report for Int'l. Patent Appln. No. PCT/US2025/046317, mailed Dec. 31, 2025 (11 pgs).

*Primary Examiner* — Jason D Shanske
*Assistant Examiner* — Matthew James O'Neill

(57) ABSTRACT

In an embodiment, a forked wearable shim for use in a suspension system, comprising: a shim body including a first planar surface and a second planar surface; a shank portion, the shank portion having an alignment opening extending through the body from the first planar surface through the second planar surface and a fastening opening extending through the body from the first planar surface through the second planar surface located between an end of the shank portion and the alignment opening; a forked-shaped second end having a first prong extending away from the shank portion and a second prong opposite the first prong and extending away from the shank portion; and a first breakaway slot and a second breakaway slot.

20 Claims, 5 Drawing Sheets

(56) References Cited

U.S. PATENT DOCUMENTS

2003/0146590 A1* 8/2003 Chamberlin ........... B62D 17/00
                 280/86.753

FOREIGN PATENT DOCUMENTS

| | | | |
|---|---|---|---|
| JP | H05193896 | A | 8/1993 |
| JP | 2003148523 | A | 5/2003 |
| JP | 2010149626 | A | 7/2010 |
| KR | 19980029953 | U | 8/1998 |

* cited by examiner

QUICK REPLACE FORKED WEARABLE SHIM

TECHNICAL FIELD

The embodiments described herein are generally directed to a wearable shim, and, more particularly, to a quick replace forked wearable shim.

BACKGROUND

Currently, standard steel shims for suspension designs do not provide adequate serviceability and life requirements, and do not allow fast swapping when worn. Further, wearable shim designs for suspension systems often require disassembling the entire suspension setup to replace the shims. These shims, which are crucial for maintaining the proper alignment, control wear, and function of the suspension components, can wear down over time due to constant stress and movement. When they do wear out, technicians must remove various interconnected parts, such as control arms and struts, to access the shims. This process can be quite complex, as it requires not only the removal of bolts and other fasteners but also careful handling to avoid damaging adjacent components.

Traditionally, the disassembly process to replace shims can take several hours, leading to significant downtime for the mobile equipment or machine involved. For businesses reliant on mobile equipment for operations, this downtime translates into lost productivity and increased costs. While technicians work diligently to replace the shims, the equipment remains out of service, delaying production schedules and impacting overall efficiency. Consequently, the current design not only complicates maintenance but also poses logistical challenges that can hinder operational effectiveness in environments where mobile equipment and machinery uptime is critical.

Accordingly, a quick replace forked wearable shim has been developed to allow fast swapping and mitigate the need of disassembling a suspension system for shim replacement. For example, U.S. Pat. No. 6,688,617 published on Feb. 10, 2004, describes a shim locking system for suspension adjustment and spacing, and U.S. Pat. No. 9,677,638, published on Jun. 13, 2017, describes a machine suspension system having link oscillation limiter. The present disclosure is directed toward overcoming one or more of the problems discovered by the inventor.

SUMMARY

In an embodiment, a forked wearable shim for use in a suspension system of a mobile equipment to control wear, comprising: a shim body including a first planar surface and a second planar surface opposite the first planar surface; a shank portion, the shank portion having an alignment opening extending through the body from the first planar surface through the second planar surface and a fastening opening extending through the body from the first planar surface through the second planar surface located between an end of the shank portion and the alignment opening; a forked-shaped second end extending from the shank portion at an end of the shank portion opposite the fastening opening and having a first prong extending away from the shank portion and a second prong opposite the first prong and extending away from the shank portion, the first prong and the second prong defining a curved inner surface extending between the first planar surface and the second planar surface; and a first breakaway slot proximate a distal end of the first prong and extending from the curved inner surface partially through the first prong and a second breakaway slot proximate a distal end of the second prong and extending from the curved inner surface partially through the first prong.

In an embodiment, a suspension system of a mobile equipment, comprising a suspension arm with a pin joint; a pin connected and configured to support the suspension arm; a forked wearable shim in a side of the suspension arm cradled to the pin and the suspension arm, having a shim body, including a first planar surface and a second planar surface opposite the first planar surface, a shank portion, the shank portion having an alignment opening extending through the body from the first planar surface through the second planar surface and a fastening opening extending through the body from the first planar surface through the second planar surface located between an end of the shank portion and the alignment opening, a forked-shaped second end extending from the shank portion at an end of the shank portion opposite the fastening opening and having a first prong extending away from the shank portion and a second prong opposite the first prong and extending away from the shank portion, the first prong and the second prong defining a curved inner surface extending between the first planar surface and the second planar surface, and a first breakaway slot proximate a distal end of the first prong and extending from the curved inner surface partially through the first prong and a second breakaway slot proximate a distal end of the second prong and extending from the curved inner surface partially through the first prong; and a fastening mechanism disposed on an outer side of the pin joint in contact with the first planar surface of the shim body.

In an embodiment, A method for replacing a forked wearable shim, the method comprising: detecting wearing in the forked wearable shim, wherein the forked wearable shim includes a shim body including a first planar surface and a second planar surface opposite the first planar surface, a shank portion, the shank portion having an alignment opening extending through the body from the first planar surface through the second planar surface and a fastening opening extending through the body from the first planar surface through the second planar surface located between an end of the shank portion and the alignment opening, a forked-shaped second end extending from the shank portion at an end of the shank portion opposite the fastening opening and having a first prong extending away from the shank portion and a second prong opposite the first prong and extending away from the shank portion, the first prong and the second prong defining a curved inner surface extending between the first planar surface and the second planar surface, and a first breakaway slot proximate a distal end of the first prong and extending from the curved inner surface partially through the first prong and a second breakaway slot proximate a distal end of the second prong and extending from the curved inner surface partially through the first prong; removing the dowel from the first opening in the first end; removing the fastening mechanism from the second opening in the first end; disengaging the forked-shaped second end from the pin joint; and replacing the forked wearable shim with a new forked wearable shim.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
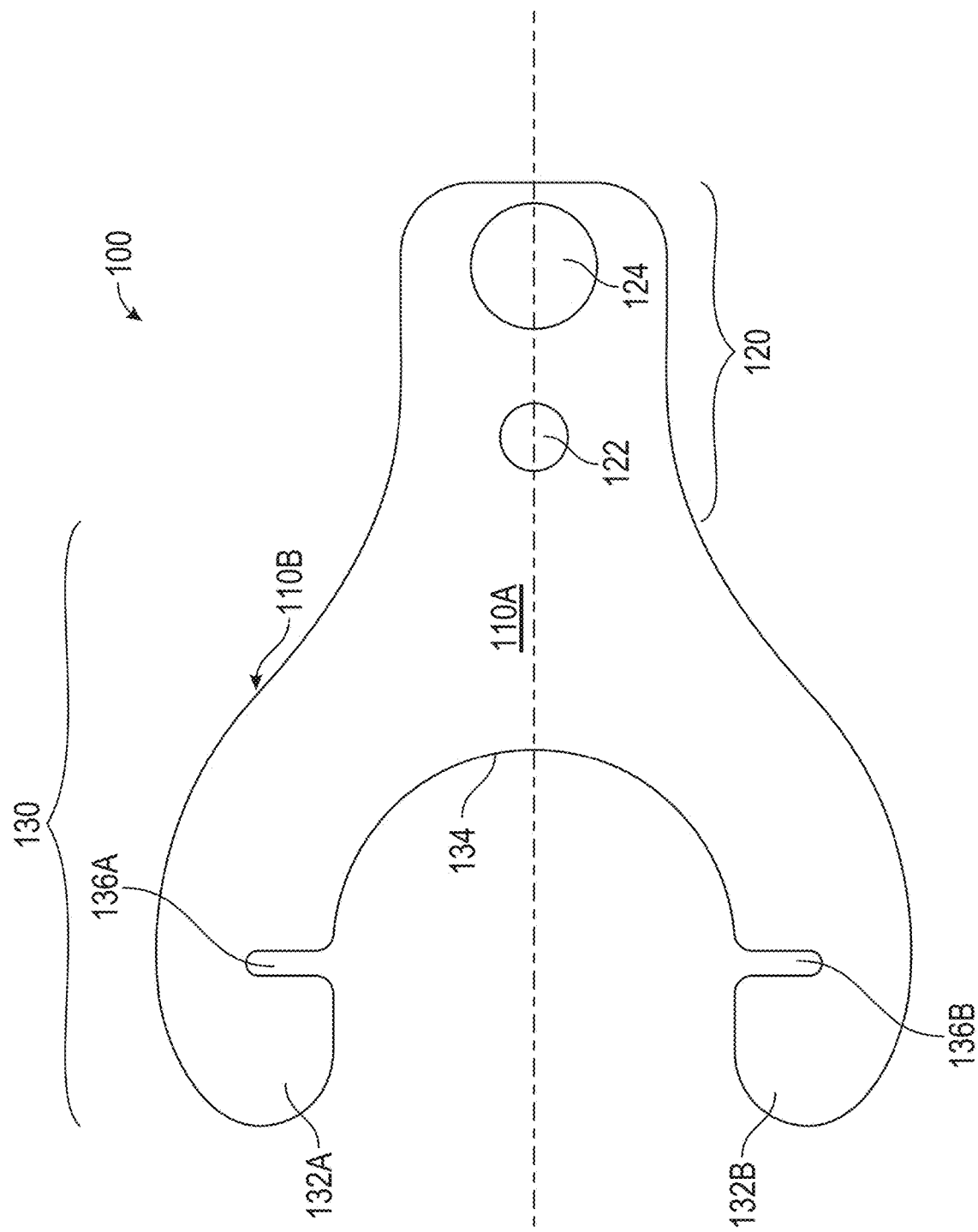
FIG. 1 illustrates a side view of a forked wearable shim, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

FIG. 1 illustrates a side view of a forked wearable shim 100, according to an embodiment. Forked wearable shim 100 illustrated can be used in mobile equipment and machinery including off-highway trucks (e.g., models 770, 772, 773, 775, or 777) and three-axle articulated trucks (e.g., models 725, 730, 735, 740, or 745) offered by Caterpillar Inc. ("Caterpillar") of Peoria, Illinois. However, the mobile equipment can be any equipment that comprises a suspension system 400, including mining trucks, such as models 785, 789, 793, 794, 796, 797, or 798 of mining trucks offered by Caterpillar.

In the illustrated example, forked wearable shim 100 comprises a shim body including a first planar surface 110A and a second planar surface 110B opposite form each other, a shank portion 120 having an alignment opening 122, and a fastening opening 124. Further, forked wearable shim comprises a forked-shaped second end 130 with a first prong 132A and a second prong 132B defining a curved inner surface 134, and a first breakaway slot 136A and a second breakaway slot 136B. In shank portion 120, alignment opening 122 extends through the body from first planar surface 110A through second planar surface 110B. Fastening opening 124 in shank portion 120 extends through the body from first planar surface 110A through second planar surface 110B located between an end of shank portion 120 and alignment opening 122.

Forked-shaped second end 130 extends from shank portion 120 at an end of shank portion 120 opposite from fastening opening 124 and having first prong 132A extending away from shank portion 120 and second prong 132B opposite to first prong and extending away from shank portion 120, the first prong 132A and the second prong 132B defining curved inner surface 134 extending between the first planar surface 110A and the second planar surface 110B. Furthermore, first breakaway slot 136A can be proximate to a distal end of first prong 132A and extend from curved inner surface 134 partially through first prong 132A. Second breakaway slot 136B can be proximate to a distal end of second prong 132B and extend from curved inner surface 134 partially through first prong 132A.

As previously mentioned, forked wearable shim 100 comprises a shim body including a first planar surface 110A and a second planar surface 110B opposite form each other. The shim body in forked wearable shim 100 of a suspension system 400 serves as the central component that provides structural support and stability to forked wearable shim 100. The shim body features first planar surface 110A and second planar surface 110B opposite each other, allowing for effective contact with both a fastening mechanism 220 and pin 210 of suspension system 400. The planar surfaces of first planar surface 110A and second planar surface 110B facilitate the distribution of fiction movement. Additionally, the shim body can be made of a friction-resistant material, which reduces wear and tear and allows for smoother interactions between forked wearable shim 100 and other components of suspension system 400. The described design of forked wearable shim's 100 shim body not only promotes longevity but also enables customizable thickness and materials to allow forked wearable shim 100 adapt to different suspension systems 400 and specific support needs. For example, material thickness could range from 2-6 mm, could be increased for specific applications though.

Further, forked wearable shim 100 comprises alignment opening 122 and fastening opening 124. Alignment opening 122 in forked wearable shim 100 of suspension system 400 can allow for precise positioning and adjustment of forked wearable shim 100 relative to other components. Alignment opening may assist forked wearable shim 100 to align correctly with suspension system 400 components such as suspension system arm 310, facilitating optimal load distribution. Additionally, alignment opening 122 in forked wearable shim 100 can be designed to accommodate a dowel or similar alignment tool, which fits into the opening to guide proper positioning. When the dowel is inserted into alignment opening 122, it ensures that forked wearable shim 100 is correctly oriented with respect to suspension system 400 and preventing misalignment.

On the other hand, fastening opening 124 can secure attaching forked wearable shim 100 to the overall framework of suspension system 400 components. Fastening opening 124 can be designed to accommodate various fastening mechanisms, such as screws, bolts, or hooks, ensuring that forked wearable shim 100 remains firmly in place during use. Fastening opening 124 can provide a reliable point of attachment and enhance the stability and integrity of the suspension system by preventing unwanted movement. Additionally, fastening opening 124 in forked wearable shim 100 can be designed to receive a bolt or similar fastening device, allowing for a secure attachment to the suspension system. When the bolt is inserted through fastening opening 124 and tightened, fastening opening 124 locks forked wearable shim 100 in place, preventing any unwanted shifts during movement.

Moreover, forked wearable shim 100 comprises a forked-shaped second end 130 with a first prong 132A and a second prong 132B. Forked-shaped second end 130 forms a curved inner diameter to shape curved inner surface 134 for engaging pin 210. Forked-shaped second end 130 with first prong 132A and second prong 132B that form curved inner surface 134 can provide targeted support and alignment within suspension system 400. First prong 132A and second prong 132B can cradle around cylindrical components, such as joints or connectors like pin 210, creating a secure fit that ensures optimal contact and stability. Curved inner surface 134 of forked wearable shim 100 can conform to the shape of the underlying structure, allowing for a seamless integration that enhances pressure distribution across the contact points of forked-shaped second end 130. This distribution in forked-shaped second end 130 reduces stress on specific areas, significantly improving overall comfort for the wearer during movement. Further, the forked configuration of forked-shaped second end 130 provides greater flexibility and adaptability within suspension system 400, enabling forked wearable shim 100 to accommodate a variety of movement patterns, whether it involves bending, twisting, or dynamic activities. Forked-shaped second end's 130 adaptability can help maintaining secure alignment and support throughout different motions, ultimately contributing to the effectiveness and functionality of suspension system 400 in enhancing mobility.

In first prong 132A and second prong 132B of forked-shaped second end 130, a first breakaway slot 136A and a second breakaway slot 136B are strategically placed as points for debris accumulation and wear, functioning like natural reservoirs that trap particles and contaminants during operation. As forked wearable shim 100 experiences repetitive stress and movement, first breakaway slot 136A and second breakaway slot 136B can gather dirt, grime, and small fragments, gradually weakening the material over time. When wear reaches a certain threshold, the accumulated debris can create pressure points, leading to localized failures or cracks. First breakaway slot 136A and second breakaway slot 136B help prevent a total loss of forked wearable shim 100, as the controlled failure mechanism allows first breakaway slot 136A and second breakaway slot 136B to break in a predictable manner rather than catastrophically, preserving the integrity of forked wearable shim 100 while facilitating easier maintenance and replacement.

Figure 2:
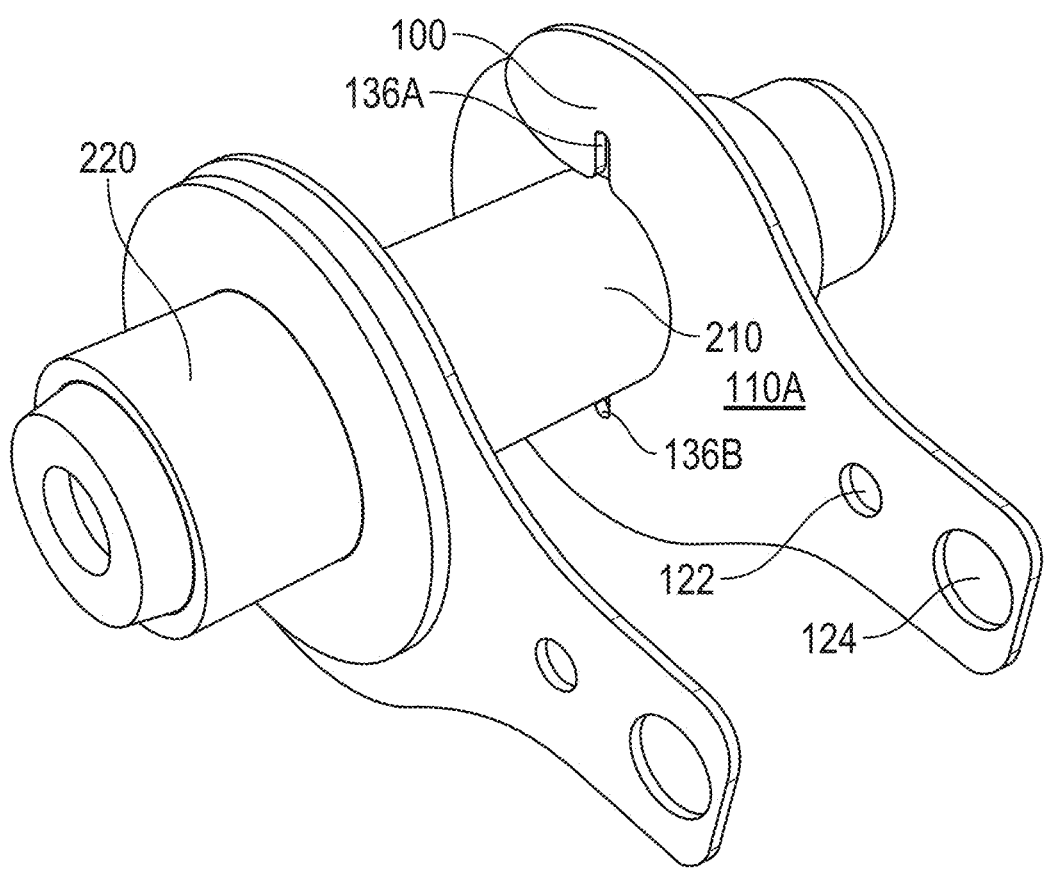
FIG. 2 illustrates an example of two forked wearable shims cradled to a pin, according to an embodiment.

FIG. 2 illustrates an example of two forked wearable shims 100 cradled to a pin 210, according to an embodiment. In suspension system 400, forked wearable shim 100 can be assembled to pin 210 to enhance stability within a suspension joint. Forked wearable shim 100 can be positioned cradled to pin 210 of the suspension components. Forked wearable shim 100, usually made of a durable material like metal or composite, then can be aligned with pin 210 to ensure forked wearable shim 100 fits against the surface of the component. Once in place, forked wearable shim 100 can be secured with a fastening mechanism 220, such as a hat shaped pin retainer, bolt or a retaining clip, ensuring that it remains tightly fitted to pin 210. In the example provided, forked-shaped second end 130 cradles pin 210 with curved inner surface 134, and a fastening mechanism 220 is disposed in an outer side of pin 210 joint in contact with first planar surface 110B of the shim body. Fastening mechanism 220 can include a hat shaped pin retainer as shown in this example. Curved inner surface 134 forked wearable shim 100 is uncradled without disassembling a suspension arm 310 allowing for fast swap and replacement for a new forked wearable shim 100.

As previously mentioned, fork wearable shim 100 cradled to pin 210 can enhance the stability and performance of various components in suspension system 400. Fork wearable shim 100 can act as a supportive interface between moving parts or rotating pin 210, allowing for precise alignment and reducing friction during operation. Fork wearable shim 100 can securely cradle the to pin 210 and ensure that the components maintain their intended positioning, which minimizes wear and tear and extends the lifespan of suspension system 400. Additionally, this setup can accommodate slight variations in alignment, making it versatile for different load conditions while maintaining smooth operation and reliability. For example, pin 210 diameter could be anywhere from 50-250 mm and fork wearable shim 100 can be designed to fit these measurements.

Furthermore, fastening mechanism 220, such as a hat shaped pin retainer, serves to securely connect and stabilize fork wearable shim 100 to pin 210, ensuring that they maintain proper alignment and function under dynamic conditions. Fastening mechanism 220 can helps absorb shocks and vibrations while allowing for controlled movement, enhancing the overall performance of the suspension system 400.

Figure 3:
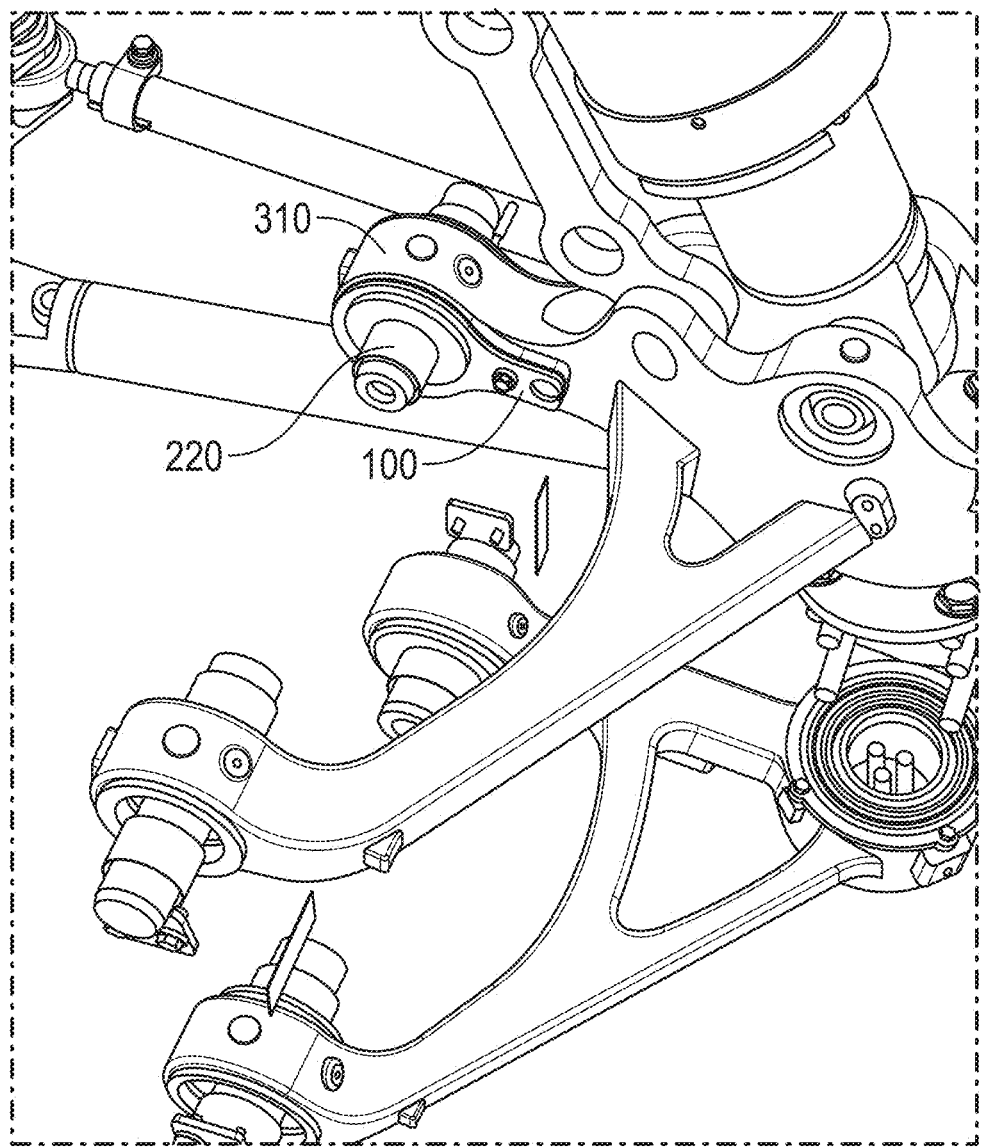
FIG. 3 illustrates a side view of a suspension system with a forked wearable shim, according to an embodiment.

FIG. 3 illustrates a side view of suspension system 400 with forked wearable shim 100, according to an embodiment. Forked wearable shim 100 can be used in conjunction with a suspension arm 310 supporting pin 210 connection that allows pin 210 to rotate and avoid wear and damage to fastening mechanism 220 that are disposed on either side of suspension arm 310 mount and surround pins 210. Forked wearable shim 100 can be assembled to suspension arm 310 supporting pin 210 join wherein alignment opening 122 can receive a dowel extending through forked wearable shim's 100 body from first planar surface 110A through second planar surface 110B and connects with suspension arm 310. Further, fastening opening 124 can receive a bolt extending through forked wearable shim's 100 body from first planar surface 110A through second planar surface 110B and connects with suspension arm 310.

Figure 4:
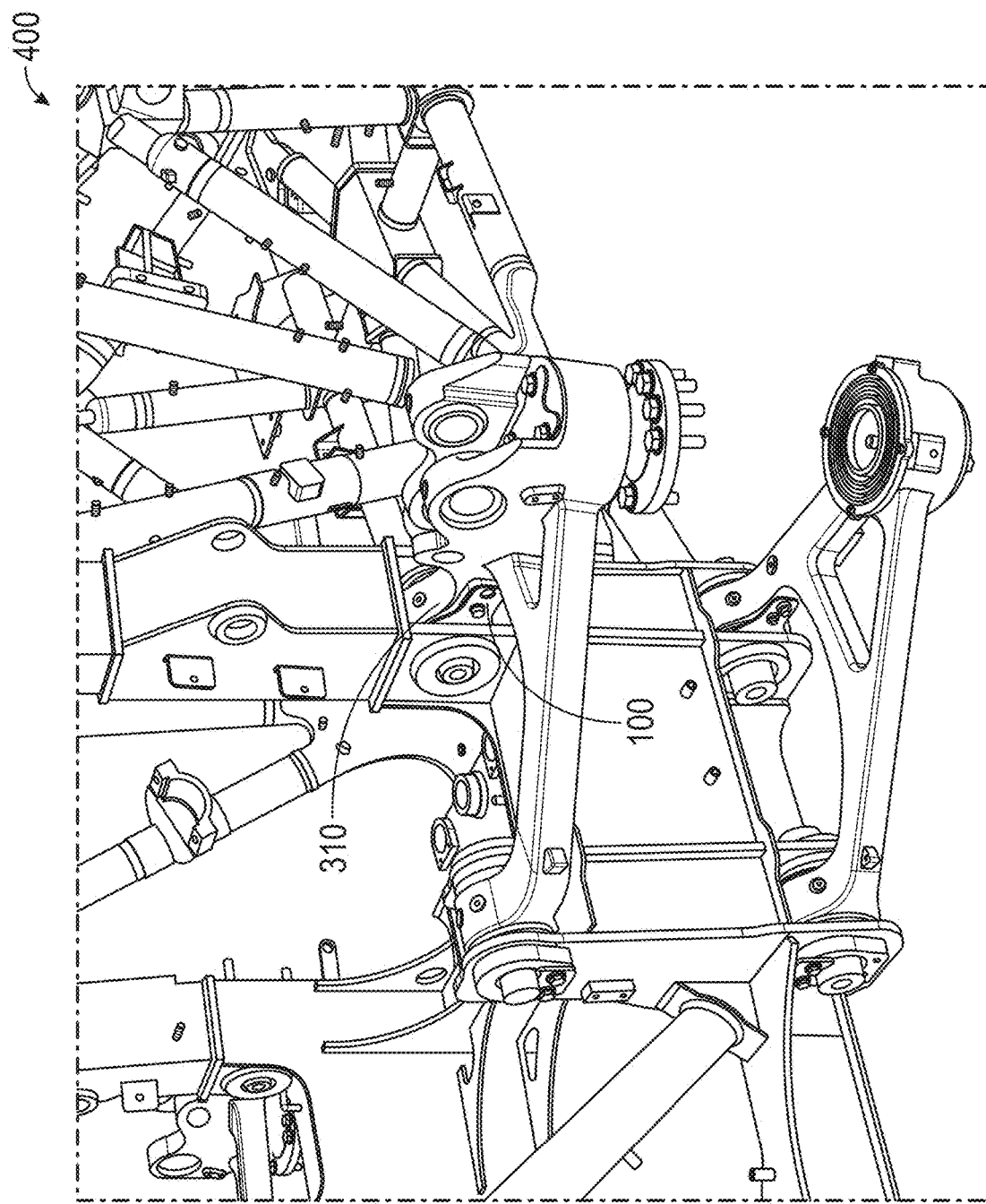
FIG. 4 illustrates a front view of a suspension system with a forked wearable shim, according to an embodiment.

FIG. 4 illustrates a front view of a suspension system 400 with a forked wearable shim 100, according to an embodiment. Forked wearable shim 100 in suspension system 400 can serve as replaceable wear component. As well, forked wearable shim 100 can act as a precision spacer designed to adjust the fit and alignment of various components, ensuring optimal performance and stability. By filling gaps between parts, forked wearable shim 100 help to maintain proper clearance and reduce unwanted movement, which can lead to wear or damage over time. It should be noted that first breakaway slot 136A and second breakaway slot 136B in forked wearable shim 100 allows for the tip of forked wearable shim 100 to break free if debris becomes lodge in the back of pin 210. This removes a failure mode where forked wearable shim 100 could be torn out and leave suspension arm 310 sloppy and unsafe. As well, allows for forked wearable shim 100 to be replaced without removing the numerous components in suspension system 400, as seen in FIG. 4.

Figure 5:
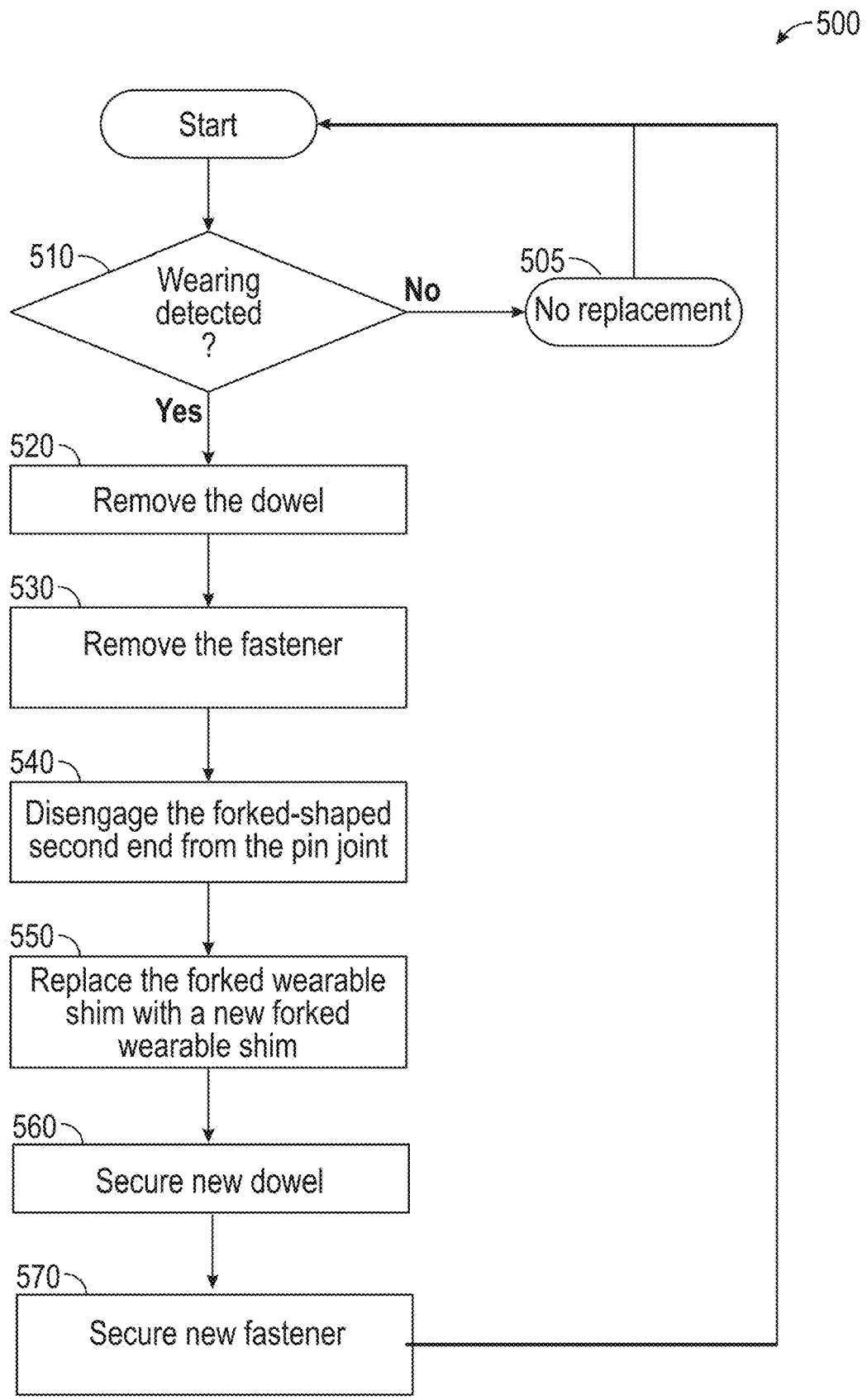
FIG. 5 illustrates a process for replacing a forked wearable shim, according to an embodiment.

FIG. 5 illustrates a process 500 for replacing a forked wearable shim 100, according to an embodiment. As seen in subprocess 510, the replacement process of forked wearable shim 100 starts by whether wearing is detected in forked wearable shim 100. If no wearing is detected in forked wearable shim 100, then there is no need for replacement, as seen in subprocess 505. On the other hand, if wearing in forked wearable shim 100 is detected, the dowel in alignment opening 122 in shank portion 120 is removed in subprocess 520. Further, in subprocess 530, the fastener is removed from fastening opening 124 in shank portion 120. Subsequently in subprocess 540, forked-shaped second end 130 is disengaged from pin 210. Finally, after removing the old forked-shaped second end 130 in subprocess 540, a new forked wearable shim 100 is installed in suspension system 400, as shown in subprocess 550 with a new forked wearable shim. The new dowel in alignment opening 122 in shank portion 120 is secured in subprocess 560. Further, in subprocess 570, the new fastener is secured to fastening opening 124 in shank portion 120.

INDUSTRIAL APPLICABILITY

Wearable shims have significant industrial applicability across various sectors, particularly in mobile equipment, manufacturing and machinery maintenance. These shims can be used in mobile equipment suspension systems 400 and heavy machinery where precise alignment is crucial. With a forked wearable shim 100, operators can quickly replace worn or misaligned forked wearable shim 100 without disassembling the entire suspension system 400, downtime is significantly reduced, leading to increased productivity and efficiency. This is particularly valuable in industries where suspension systems 400 operates under high stress and frequent adjustments are necessary, such as mining and construction.

Additionally, the adaptability of forked wearable shim 100 makes them ideal for applications in different types and models of mobile equipment and suspension systems 400. As suspension systems 400 often require fine-tuning to accommodate wear and tear or changes in operating conditions, easily replaceable forked wearable shim 100 can facilitate rapid adjustments on the fly. This flexibility not only enhances the longevity of suspension system 400 components but also enables quicker replacement to shifting industry demands.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine, suspension system, or mobile equipment. Hence, although the present embodiments are, for convenience of explanation, depicted and described as being implemented in a suspension system and off-highway trucks, it will be appreciated that it can be implemented in various other types of equipment and machines with wearable shims, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A forked wearable shim for use in a suspension system of a mobile equipment to control wear, comprising:
    a shim body including
        a first planar surface and a second planar surface opposite the first planar surface;
        a shank portion, the shank portion having an alignment opening extending through the body from the first planar surface through the second planar surface and
        a fastening opening extending through the body from the first planar surface through the second planar surface located between an end of the shank portion and the alignment opening;
    a forked-shaped second end extending from the shank portion at an end of the shank portion opposite the fastening opening and having a first prong extending away from the shank portion and a second prong opposite the first prong and extending away from the shank portion, the first prong and the second prong defining a curved inner surface extending between the first planar surface and the second planar surface; and
    a first breakaway slot proximate a distal end of the first prong and extending from the curved inner surface partially through the first prong and a second breakaway slot proximate a distal end of the second prong and extending from the curved inner surface partially through the first prong.

2. The forked wearable shim of claim 1, wherein the forked wearable shim is installed in a suspension arm of the suspension system.

3. The forked wearable shim of claim 1, wherein the forked wearable shim is assembled to a suspension arm supporting a pin joint;
    wherein the alignment opening receives a dowel extending through the body from the first planar surface through the second planar surface and connects with the suspension arm;
    wherein the fastening opening receives a bolt extending through the body from the first planar surface through the second planar surface and connects with the suspension arm.

4. The forked wearable shim of claim 3, wherein the forked-shaped second end cradles the pin with the curved inner surface; and
    a fastening mechanism is disposed in an outer side of the pin joint in contact with the first planar surface of the shim body.

5. The forked wearable shim of claim 4, wherein the fastening mechanism is a hat shaped pin retainer.

6. The forked wearable shim of claim 4, wherein the curved inner surface of the forked wearable shim is uncradled without disassembling a suspension arm.

7. The forked wearable shim of claim 4, wherein the first breakaway slot and the second breakaway slot each allow for the wearable shim to break free when debris becomes lodged in the back of the pin joint.

8. The forked wearable shim of claim 1, wherein the forked wearable shim allows a fast swap and replacement for a new forked wearable shim.

9. The forked wearable shim of claim 1, wherein the forked wearable shim is designed to fail and not force a joint to become loose if material were to lodge into the joint.

10. A suspension system of a mobile equipment, comprising
    a suspension arm with a pin joint;
    a pin connected and configured to support the suspension arm;
    a forked wearable shim in a side of the suspension arm cradled to the pin and the suspension arm, having
        a shim body, including
            a first planar surface and a second planar surface opposite the first planar surface,
            a shank portion, the shank portion having an alignment opening extending through the body from the first planar surface through the second planar surface and a fastening opening extending through the body from the first planar surface through the second planar surface located between an end of the shank portion and the alignment opening, a forked-shaped second end extending from the shank portion at an end of the shank portion opposite the fastening opening and having a first prong extending away from the shank portion and a second prong opposite the first prong and extending away from the shank portion, the first prong and the second prong defining a curved inner surface extending between the first planar surface and the second planar surface, and a first breakaway slot proximate a distal end of the first prong and extending from the curved inner surface partially through the first prong and a second breakaway slot proximate a distal end of the second prong and extending from the curved inner surface partially through the first prong; and a fastening mechanism disposed on an outer side of the pin joint in contact with the first planar surface of the shim body.

11. The system of claim 10, wherein the forked wearable shim is assembled to a suspension arm supporting the pin joint;

wherein the alignment opening receives a dowel extending through the body from the first planar surface through the second planar surface and connects with the suspension arm;

wherein the fastening opening receives a bolt extending through the body from the first planar surface through the second planar surface and connects with the suspension arm.

12. The system of claim 10, wherein the forked-shaped second end cradles the pin with the curved inner surface.

13. The system of claim 10, wherein the fastening mechanism is a hat shaped pin retainer.

14. The system of claim 10, wherein the first breakaway slot and the second breakaway slot each allow for the wearable shim to break free when debris becomes lodged in the back of the pin joint.

15. The system of claim 10, wherein the forked wearable shim allows a fast swap and replacement for a new forked wearable shim.

16. A method for replacing a forked wearable shim, the method comprising:

detecting wearing in the forked wearable shim, wherein the forked wearable shim includes a shim body including a first planar surface and a second planar surface opposite the first planar surface, a shank portion, the shank portion having an alignment opening extending through the body from the first planar surface through the second planar surface and a fastening opening extending through the body from the first planar surface through the second planar surface located between an end of the shank portion and the alignment opening, a forked-shaped second end extending from the shank portion at an end of the shank portion opposite the fastening opening and having a first prong extending away from the shank portion and a second prong opposite the first prong and extending away from the shank portion, the first prong and the second prong defining a curved inner surface extending between the first planar surface and the second planar surface, and a first breakaway slot proximate a distal end of the first prong and extending from the curved inner surface partially through the first prong and a second breakaway slot proximate a distal end of the second prong and extending from the curved inner surface partially through the first prong;

removing a dowel from the first opening in the first end;

removing a fastening mechanism from the second opening in the first end;

disengaging the forked-shaped second end from the pin joint; and replacing the forked wearable shim with a new forked wearable shim.

17. The method of claim 16, further comprising assembling the forked wearable shim to the suspension arm supporting the pin joint;

wherein the alignment opening receives a dowel extending through the body from the first planar surface through the second planar surface and connects with the suspension arm;

wherein the fastening opening receives a bolt extending through the body from the first planar surface through the second planar surface and connects with the suspension arm.

18. The method of claim 16, further comprising cradling the forked-shaped second end to the pin with the curved inner surface.

19. The method of claim 16, wherein the fastening mechanism is a hat shaped pin retainer.

20. The method of claim 16, wherein the first breakaway slot and the second breakaway slot each allow for the wearable shim to break free when debris becomes lodged in the back of the pin joint.

* * * * *